United States Patent [19]

Sonoda

[11] Patent Number: 4,797,245

[45] Date of Patent: Jan. 10, 1989

[54] INJECTION MOLDING PRESS

[75] Inventor: Takefumi Sonoda, Yamaguchi, Japan

[73] Assignee: Ube Industries, Ltd., Ube, Japan

[21] Appl. No.: 113,948

[22] Filed: Oct. 27, 1987

[30] Foreign Application Priority Data

Nov. 28, 1986 [JP] Japan ............................ 61-283277
Dec. 2, 1986 [JP] Japan ............................ 61-287451

[51] Int. Cl.4 .................. B29C 45/80; B29C 45/23; B29C 45/03
[52] U.S. Cl. .................. 264/328.4; 264/328.9; 425/145; 425/150; 425/382.4; 425/564
[58] Field of Search ............... 425/145, 149, 542, 562, 425/564, 574, 150, 382.4; 264/328.1, 328.2, 328.4, 328.9

[56] References Cited

U.S. PATENT DOCUMENTS

| | | | |
|---|---|---|---|
| 1,367,196 | 2/1921 | Lucas | 425/587 X |
| 2,382,655 | 8/1945 | Nichols | 425/587 X |
| 3,118,184 | 1/1964 | Swenson | 425/587 X |
| 3,263,276 | 8/1966 | Maier | 425/587 X |
| 3,395,424 | 8/1968 | Nouel | 425/542 |
| 3,398,435 | 8/1968 | Nouel | 425/587 X |
| 3,456,298 | 7/1969 | Foster et al. | 264/40.5 X |
| 3,464,091 | 9/1969 | Bielfeldt | 425/574 |
| 3,600,755 | 8/1971 | Cook | 425/574 |
| 3,698,845 | 10/1972 | Paulson | 425/585 X |
| 3,706,827 | 12/1972 | Nott et al. | 425/585 X |
| 3,767,339 | 10/1973 | Hunkar | 425/149 |
| 3,806,294 | 4/1974 | Hehl | 425/574 |
| 3,888,393 | 6/1975 | Drori | 425/587 X |
| 4,161,380 | 7/1979 | Bishop | 425/145 |
| 4,386,903 | 6/1983 | Wybenga | 425/564 |
| 4,422,842 | 12/1983 | Monnet | 425/586 X |

FOREIGN PATENT DOCUMENTS

| | | | |
|---|---|---|---|
| 0015026 | 9/1962 | Japan | 425/562 |
| 38-18974 | 9/1963 | Japan | 425/562 |
| 2041013 | 2/1987 | Japan | 425/562 |

Primary Examiner—Willard Hoag
Attorney, Agent, or Firm—Frank J. Jordan; C. Bruce Hamburg; Manabu Kanesaka

[57] ABSTRACT

In an injection molding press of the present invention, a plunger is inserted into a barrel and a material inlet is provided on the rear side of the barrel. A valve seat is provided in the inner periphery of the barrel and a valve body which can be brought into contact with the valve seat is provided on the end of the plunger. In addition, a lengthwise moving unit is aligned with the plunger and, when the plunger is moved lengthwisely, a portion having increasing diameters is brought into contact with a portion having decreasing diameters so that a material passage is opened and closed. A sleeve is engaged in the end of the barrel in such a manner that it can slide in the axial direction of the barrel and has an injection hole at one end. A lengthwise barrel-moving unit is provided on the barrel or the plunger. After a material has been stored in the barrel, the barrel is moved forward so that the material is injected from the injection hole into a mold.

15 Claims, 8 Drawing Sheets

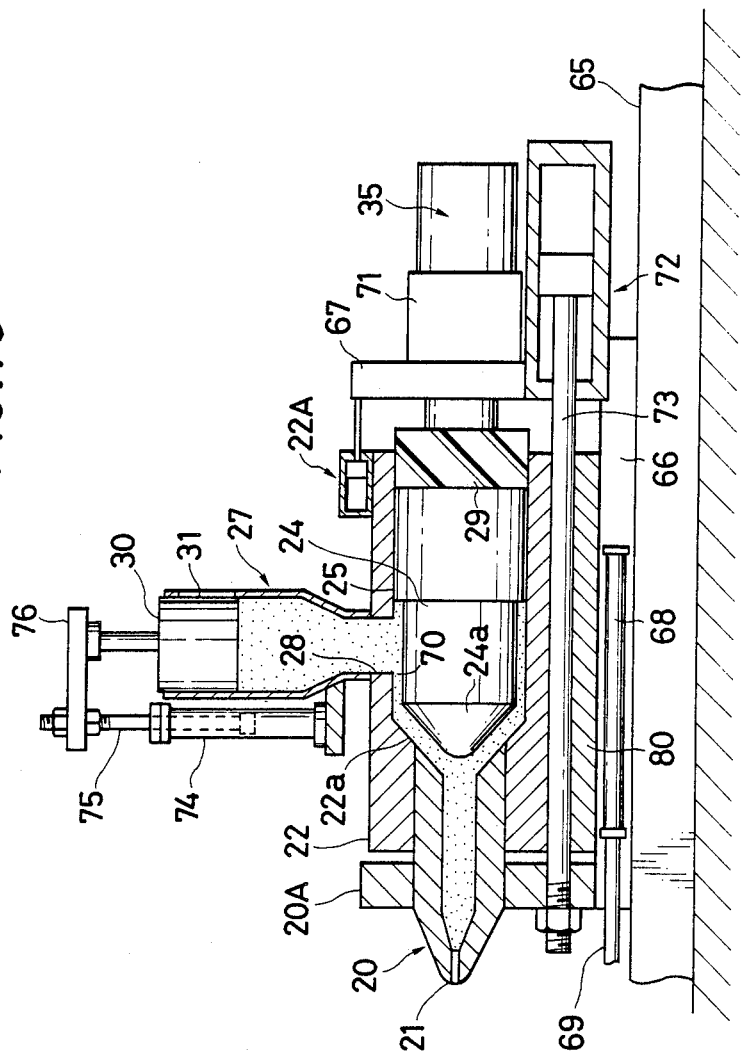

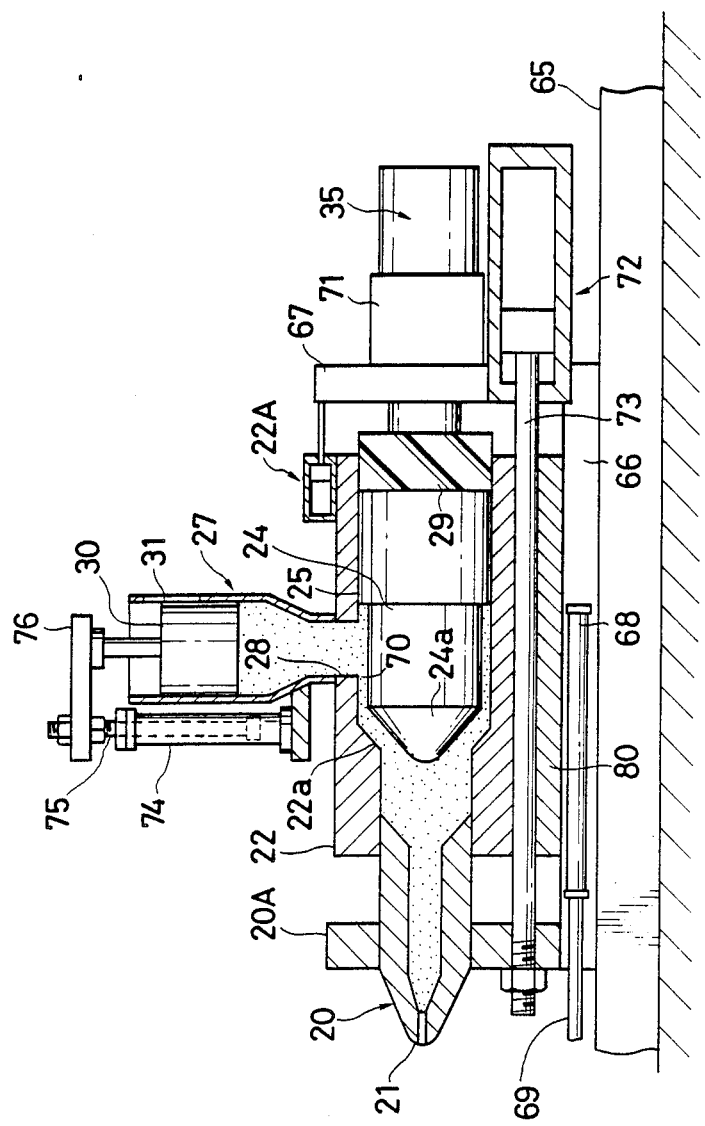

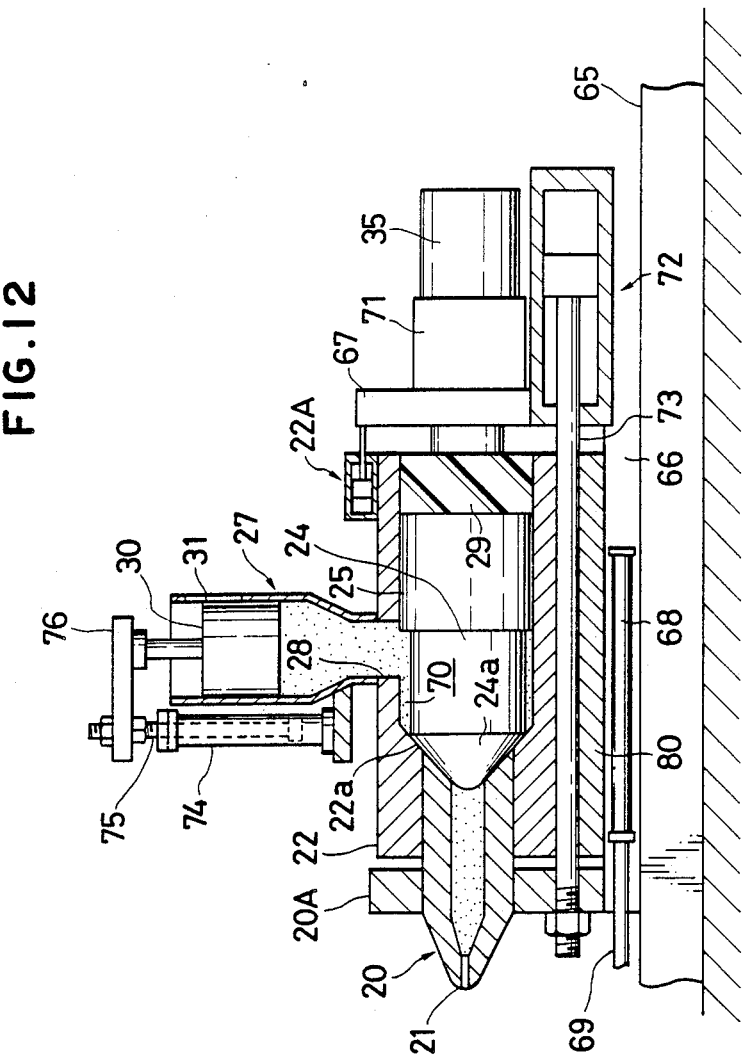

INJECTION MOLDING PRESS

FIELD OF THE INVENTION AND RELATED ART STATEMENT

The present invention relates to an injection molding press, particularly to an injection molding press which is suitably used for bulk molding materials, such as bulk molding compounds (BMC), containing glass fibers.

Molding materials in which glass fibers are mixed in thermosetting resins such as unsaturated polyesters have various compositions and properties, corresponding to the uses of the finished product and the methods of molding.

The mechanical properties of molded products are highly correlated to the state of the glass fibers in them, and molded products containing longer and straight fibers are improved in mechanical strength.

The length of the glass fibers contained in a molded product depends upon not only the length of glass fibers used as a raw material but also the method of molding, and a method of molding which produces as little breakage loss as possible is necessary for improving the mechanical properties of a molded product.

A plunger-type molding press produces smaller breakage loss and less bending of glass fibers, as compared with a screw-type molding press.

A conventional plunger-type injection molding press is provided with a barrel having an injection nozzle at the top thereof and a stuffer for supplying materials into the barrel. A plunger is engaged in the barrel in order to inject the materials in the barrel from the nozzle. A port for supplying materials from the stuffer opens into the barrl in the vicinity of the nozzle. Materials to be injected are supplied into the barrel from the material supply port and any back flow is stopped by a check valve. Then, when the plunger is moved forward, the materials are injected into a mold from the nozzle.

Storage of a given amount of material at the top of the barrel is called metering and the storage process is called a metering process. When thermoplastic resins are used as materials, this is also called a plasticating process.

In this type of conventional molding press, since the material supply port is provided near the nozzle, the materials which first enter the barrel from the material supply port collect on the plunger side and the materials which later enter the barrel collect on the nozzle side. Therefore, since, when injected, the materials first entering the barrel are injected later than the materials later entering the barrel, the materials first entering the barrel easily stay in the barrel for a long time. During injection, a sealing portion of the plunger passes by the material supply port and is thus easilY damaged.

In another conventional plunger-type injection molding press, a material supply port from a stuffer is open at the end of a barrel which is opposite to a nozzle and there is no check valve.

In this type of injection molding press, the metering of materials is unstable because back pressure cannot be applied to the materials in the barrel and air is easily drawn in this press. Injection molding presses which can solve the above-described drawbacks have been proposed in Japanese Patent Application Nos. 79197/1985 and 168898/1985 (U.S. patent application Ser. No. 852,573 ), which were assigned to the present assignee.

In each of these two injection molding presses, a plunger having a back-flow preventing mechanism comprising a check ring or ball near one end is provided in a cylindrical barrel having a nozzle at one end and a relatively low-temperature regulator in its periphery in such a manner that the plunger can move forward and backward and can rotate, and a passage for materils is formed between the -internal periphery of the barrel and the external periphery of the plunger. A material inlet provided on the rear side of the barrel is provided with a material feeder, for example, of a stuffer type. The material feeder may also be apparatus of other types such as a screw feeder which has a sufficient ability to supply materials.

The rear side of the plunger projects from the barrel and is connected to a mechanism which causes the plunger to rotate and move forward and backward.

In such a injection molding press, materials to be injected are supplied to the top of the barrel from the material feeder through the material passage and the back-flow preventing mechanism. When a desired amount of material such as BMC is stored in the front of the barrel, metering is completed and, when the plunger is then moved forward, the material is injected from the nozzle. However, in this case, the material first entering the material passage from the material feeder is the first to leave the barrel. In addition, the rotation of the plunger makes the flow of the materials very smooth and uniform. In this plunger-type injection molding press, the metering ability increases with the increase in the number of rotations, in spite of the absence of a portion corresponding to the flight of a screw type.

In each of the above-described two injcction molding presses assigned to the assignee of this invention, a stopper portion for preventing the check ring from separating is provided on the end of the plunger and comprises a plurality of pawls which radially project. The stopper portion comprising the pawls stirs the material, as the plunger rotates, and thus causes damage of glass fibers in the material. In addition, since the material is stored at the end of the barrel by the backward movement of the plunger, a longer stroke length of the backward movement of the plunger is required for storing a necessary amount of materials for injection molding. In other words, the length of the plunger must be sufficient to ensure a long backward stroke. Therefore, since the plunger has a cantilever mechanism, such a large axial length applies a large cantilever load to the plunger and thus easily causes the deformation thereof.

It was found from various investigations into the above-described injection molding presses that, since the molding materials in the material-pushing feeder and the barrel are compressed during the metering process, after the metering process has been completed, the materials tend to expand so as to be in an equilibrium pressure state, resulting in a further backward movement of the plunger and the occurrence of a so-called drooling phenomenon in which the molding materials flow out from the nozzle. These phenomena necessitate much labor for setting conditions of the metering of a necessary amount of material and produce scattering in the meterings between shots.

Partial differences in viscosity and compressiblity of a molding material or differences in viscosities and compressibilities of molding materials between lots also produce scattering in the metering. Since this scattering in metering greatly affects the appearances and physical properties of molded products, stable qualities of molded products cannot easily be obtained.

In each of the injection molding presses of Japanese Patent Application Nos. 79197/1985 and 168898/1985, during the metering process, materials are supplied to the top of the barrel in a state wherein the plunger or the screw is placed in the front of the barrel of the injection cylinder, and back pressure is applied to the materials.

However, during this metering process, the resistance to backward movement of the plunger or the screw is easily increased by hardening of the materials at the support portion of the screw or the plunger, scoring, an increase in the stuffer pressure, or an increase in the length of the screw. If the resistance to backward movement is increased, a back pressure applied to the materials to be metered is increased and glass fibers are thus easily damaged.

In addition, if the resistance to backward movement is increased, the pressure applied in the stuffer must be unpreferably increased, or, if the stuffer pressure is not changed, the metering takes a long time and the metering ability is decreased.

Although it can be conceived that a hydraulic mechanisms aligned with the screw or the plunger in order to cancel the resistance to backward movement, this mechanism requires a fairly complicated and delicate operation and thus will be extremely expensive to run. In addition, since the resistance to backward movement changes with every injection process and is not constant, the operating conditions of the hydraulic mechanism must be set over again with each injection process, and this thought thus lacks practicality.

It was recognized that the above-described structures proposed in Japanese Patent Application Nos. 79197/1985 and 168898/1985 have problems to be solved in that the speed of metering is easily changed and the time of metering is likely to be scattered.

In other words, materials are metered by applying a pressure to them in the stuffer and the metering ability virtually depends upon this applied pressure. This means that the metering is greatly affected by the viscosity of the material and other flow resistances.. In the case of a screw type, the metering ability depends upon the material transporting ability of the screw and a stuffer pressure has no effect on the metering ability as far as it is a given value or more. This point is a large difference between a plunger type and a screw type.

Although materials for injection molding are produced to be as uniform as possible, variation inevitably occurs in the amount of glass fibers added and in the viscosity of resins. Therefore., the metering ability also will show variation and the metering time will be longer than an expected time, according to circumstances. When molding, such as the molding of large-size parts, is performed with a high cycle, the metering time sometimes takes a large proportion of the molding cycle and also causes variation in the quality of the molded products: thus, variation in metering time is undesirable.

OBJECT AND SUMMARY OF THE INVENTION

It is an object of the present invention to provide an injection molding press which exhibits extremely small damage of glass fibers contained in raw materials and thus can produce molded products having high strength and excellent quality.

It is another object of the present invention to provide an injection molding press and a method of operating the same which comprises a plunger having a short axial length and which thus has a high structure strength.

It is a further object of the present invention to provide an injection molding press and a method of operating the same which exhibits an improved efficiency of injection molding and improved qualities of molded products.

The injection molding press of the present invention comprises a barrel having, a material inlet on its rear side; a sleeve which is engaged with the barrel in such a manner that it can slide in the axial direction and which has an injection hole at one end; a plunger which is inserted into the barrel and has a diameter such that a material passage is formed between the periphery of the plunger and the inner periphery of the barrel; a unit for rotating- the plunger; a valve seat which is provided at an intermediate position of the barrel; a valve body which is provided on the plunger; a lengthwise plunger-moving unit which is aligned with the plunger so that the plunger is moved in its axial direction and the valve seat and the valve body are brought into contact with and separated from each other; and a lengthwise barrel-moving unit which causes the barrel or the plunger to move in the axial direction so that materials are injected.

In the injection molding press of the present invention employing the above-described structure, when the plunger is caused to slightly move forward or backward so that the valve seat and the valve body are separated from each other, the material sent from a press feeder can pass between the valve seat and the valve body. When the barrel is then gradually moved backward, the material can be stored in front of the end of the plunger (that is to say, the metering process is advanced).

On the other hand, when the valve seat and the valve body are brought into contact with each other, the retreat of the material is blocked. When the barrel is then moved forward, the material is injected from the sleeve injection hole.

In this way, in the press of the present invention, the metering process is performed by the backward movment of the barrel but not performed by the backward movevent of the plunger, as with conventional presses, thus only a short plunger is sufficient. In addition, check ring-holding pawls need not be provided on the end of the plunger, resulting in an decrease in damage of glass fibers.

In an embodiment of the present invention, a heater for heating materials remaining in the sleeve is provided on the end of the plunger, whereby increase in viscosity of materials is decreased and smoother injection molding can thus be achieved.

In the present invention, the plunger may be a screw type or may be other types having any form of projection or irregular structure. In addition, the end of the plunger may be provided with a support for detachably supporting the plunger from the inner periphery of the barrel so that the barrel is a center impeller type and the bending stress on the plunger is relieved. Various types of stuffer, such as those utilizing a plunger or a screw, may be used, as long as they have structures which can sufficiently supply materials by applying pressure.

In an injection molding press of another embodiment of the present invention which is provided with means for detecting the backward speed of the barrel, a material-pushing feeder or a rotational drive unit for a plunger is controlled so that the backward speed becomes a given value (a predetermined value or more).

In the injection molding press having the above-described structure, if the metering speed of material decreases, it can be increased by increasing the pressure applied in the material-pushing feeder or by increasing the rotational speed of the plunger. If the metering speed is too high, the speed is decreased by employing reverse means. In this way, the metering ability is kept at a given level or more, leading to improvement in the molding cycle and less variation in quality.

Controlling the metering speed at a given value produces an efficient injection molding cycle and improves the quality of the molded products.

When each of the injection molding presses of the present invention is operated, it is preferable that the pressure exerted on the material by means of the plunger or the screw of the material-pushing feeder be reduced before the completion of the metering process.

There is a relationship, shown in FIG. 9, between the pressure on a material in the material-pushing feeder and the metering speed: if the pressure is reduced, the metering speed is also reduced and, if the pressure is a given value or less, the metering speed becomes zero.

Therefore, in the present invention, a reduction in the pressure before the completion of the metering process reduces the metering speed. Thus, at the time of the completion of the metering process, the pressure on the material in the barrel and in the material-pushing feeder is first reduced and the equilized, whereby the backward movement of the plunger and material leakage phenomena such as drooling can be prevented. This produces an improved accuracy of metering and improved quality of the molded products.

When each of the injection molding presses of the present invention is operated, it s preferable that the screw or the plunger be moved backward before the start of the metering process so that a space equal in volume to 30 to 99% of the predetermined amount of material to be metered is produced at the end of the screw or the plunger.

If such a space is formed, back pressure applied to material during the metering is small, the damage to glass fibers is controlled, and the molded products have excellent characteristics such as impact strength. Metering ability and productivity are also increased.

BRIEF DESCRIPTION OF THE DRAWINGS

FIGS. 10, 11 and 12 are respectively sectional views of the injection molding press of the invention.

PREFERRED EMBODIMENTS

Figure 1:
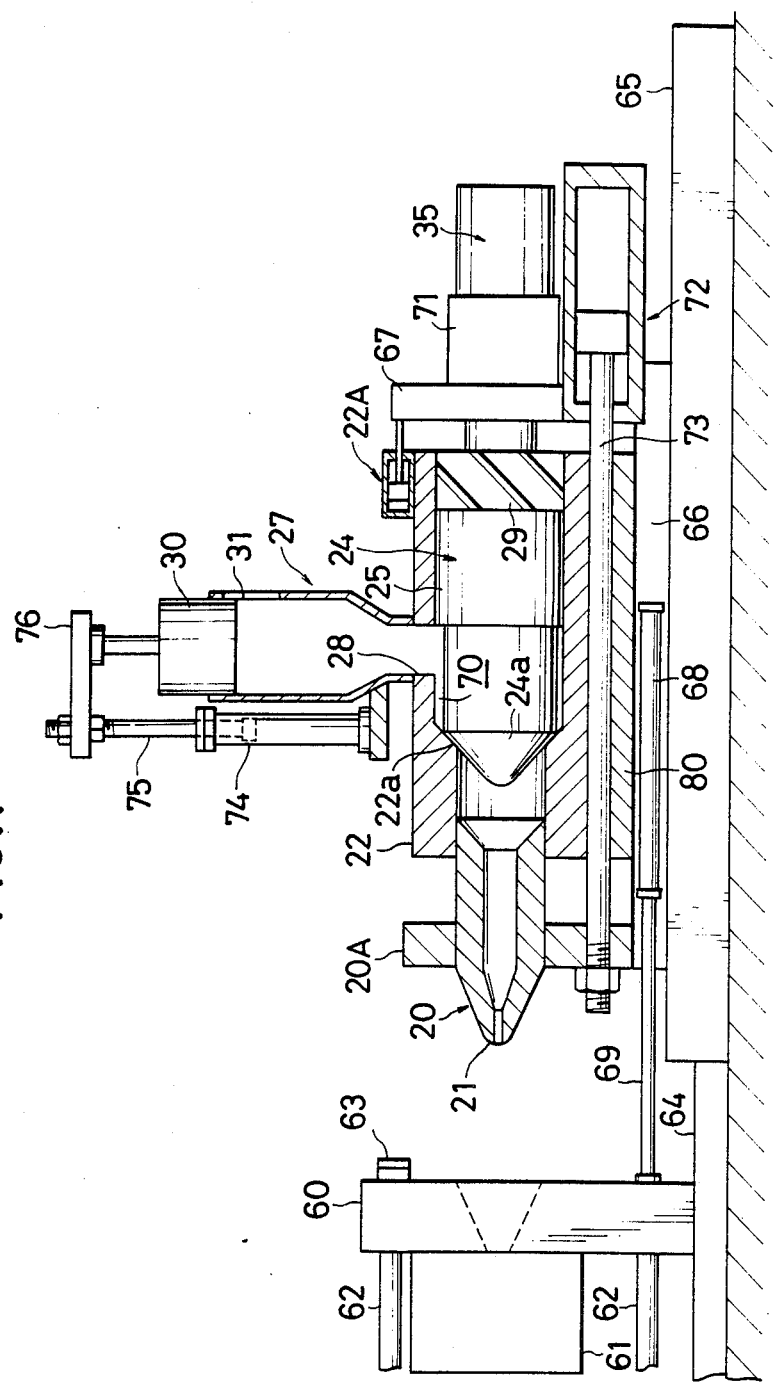
FIG. 1 a sectional view of the whole of the press of an embodiment.
Figure 2:
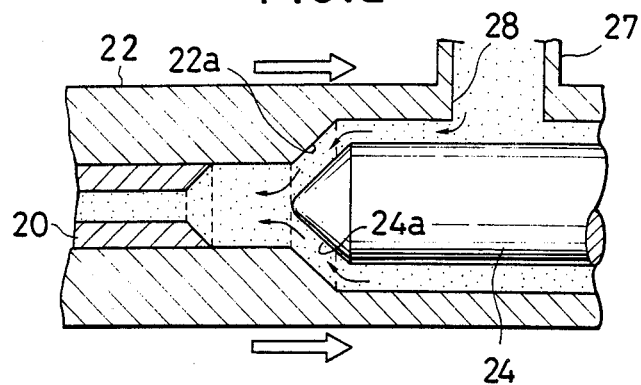
FIG. 2 is a partial sectional view of the same.

FIG. 1 is a sectional view of the whole of an injection molding press to which an embodiment of the present invention relates and FIG. 2 is a partial sectional view used for explaining the operation of the same.

An injection nozzle 21 is provided on the end of a sleeve 20 which is engaged in the end of a barrel 22 having a heater at a relatively low temperature in its periphery so that the sleeve can project from and retract into the end of the cylindrical barrel 22. The inner periphery of the barrel 22 and the outer periphery of the sleeve 20 slide on each other through an appropriate sealing structure (not shown) so that a sealed state is maintained. The barrel 22 is disposed in such a manner that the nozzle 21 is allowed to face a material injection hole of a fixed mold 61 which is fixed to a stationary platen 60. Columns 62 are mounted on the stationary platen 60 by means of column nuts 63. A machine base 64 on the lock side and a machine base 65 on the injection press side are arranged in parallel, and a block 66 is slidably provided on the machine base 65. A sleeve-supporting wall 20A is fixed on the block 66 in the front thereof and a mounting base 80 for the barrel and a motor-supporting member 67 are slidably provided in the rear portion thereof. A cylinder 68 is provided on the block 66 for moving it. The end of a piston rod 69 of the cylinder 68 is fixed to the fixed board 60 so that the nozzle 21 is brought into contact with the fixed mold 61 or moved backward to the state shown in the figure by the operation of the cylinder 68.

A plunger 24 is provided in the barrel 22 in such a manner that it can move forward and backward and can rotate. A passage 70 for materials is formed between the inner periphery of the barrel 22 and the outer periphery of the plunger 24. A rotational drive unit such as a hydraulic motor 35 is connected to the plunger 24 through the motor-supporting member 67 and a bearing housing 71. In addition, a sealing cylinder 22A as a lengthwise drive unit is disposed between the barrel 22 and the motor-supporting member 67. An injection cylinder 72 and a piston rod 73 are also disposed between the motor-supporting member 67 and the supporting wall 20A (the injection cylinder 72 may be provided on the barrel 22).

A convex portion 25 which is in contact with the inner periphery of the barrel 22 is provided in the center of the plunger 24. A screw 29 for exhausting leaked materials is also provided in the rear of the convex portion 25 of the plunger 24. This screw 29 serves to smoothly exhaust the material leaked backward from a clearance between the outer periphery of the convex portion 25 and the inner periphery of the barrel 22 into the rear portion of the barrel 22 and is provided in the screw direction reverse to the rotational direction of the plunger 24.

Reference numeral 27 denotes a stuffer which is provided perpendicular to a material inlet 28 provided on the rear side of the barrel 22 and in which a stuffer plunger 30 for pushing materials downward is provided. Reference numeral 31 denotes an inlet for supplying materials which is provided in the side of the stuffer 27. A cylinder 74 for longitudinally moving the stuffer plunger 30 is perpendicularly provided on the stuffer in such a manner that it looks upward. The upper end of a piston rod 75 of the cylinder 74 is connected to the stuffer plunger 30 by a connecting member 76.

In addition, the end portion of the plunger forms a valve body 24a comprising a tapered cone, and a valve seat 22a comprising a taper in which its diameter decreases toward the front is formed in the inner periphery of the barrel 22 so as to engage with the tapered valve body 24a. The rear end of the sleeve 20 also has a conical concave shape corresponding to the shape of the plunger end.

In the press shown in FIG. 1, in a state wherein the barrel is placed at the forward limit, and the plunger 24 is placed so that the valve body 24a is separated from the valve seat 22a and is rotated at, for example, 5 to 100 rpm, materials such as BMC are charged in the stuffer 27 and pushed downward by the stuffer plunger. As a result, as shown in FIG. 10, the materials are sent forward through the outer periphery of the plunger 24, passed between the valve seat 22a and the valve body 24a, and stored in turn in the end of the plunger 24 and in the sleeve 20.

During this metering process, the barrel 22 is gradually moved backward as shown in FIG. 2. At the same time, back pressure can be applied to the material by controlling hydraulic pressure in a chamber on the rod end side of the injection cylinder 72. FIG. 11 shows a state wherein the barrel 22 is placed at the backward limit after this movement.

The rotation of the plunger 24 can homogenize the resin materials around the plunger 24 and prevent the shortcircuiting of the flow path of materials. In addition, the pushing action of the stuffer plunger 30 and the rotating action of the plunger 24 cause materials to be pushed so that it passes not only through the material passage 70 above the plunger 24 but also through the material passage 70 below the plunger 24 and is sent while moving around the plunger 24 upward or downward, whereby material or parts of material which flow with difficulty can be passed smoothly through the whole of the periphery of the barrel 22, without staying in the barrel. In addition, since there is no member such as a check ring, damage to glass fibers contained in the material is reduced.

After a sufficient amount of material has been metered in the sleeve and the end of the barrel, the plunger 24 is moved forward by the cylinder 22A so that the valve body 24a is seated in the valve seat 22a and the retreat of the materials in the sleeve 20 is cut off. The barrel 22 is then moved forward by the injection cylinder 72 through the motor-supporting member 67. Consequently, the material metered in the end of the barrel 22 is pushed, flows into the sleeve 20, and is injected from the nozzle 21 together with the material already in the sleeve. FIG. 12 shows a state wherein the barrel 22 is placed at the forward limit after this injection.

Figure 3:
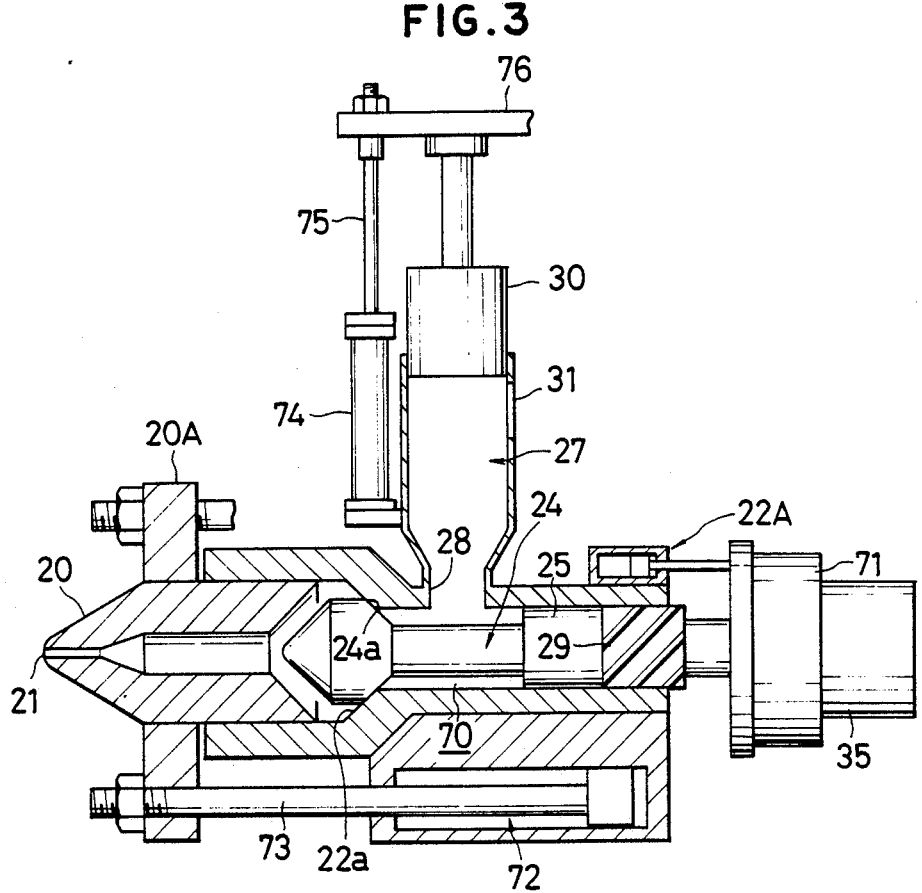
FIGS. 3, 4, 5, 6, and 7 are respectively sectional views of different embodiments.

FIG. 3 is a sectional view of main portions of an injection molding press to which another embodiment relates.

Figure 4:
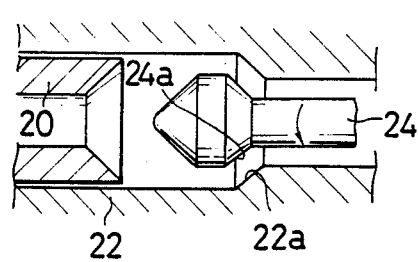

In the embodiment shown in FIG. 3, a barrel 22 has a larger diameter on the end side and is provided with a valve seat 22a having a diameter expanding toward the end in an intermediate position of the inner periphery. The end of the plunger 24 has an expanded head, the base end of which is provided with a valve body 24a having a diamteter expanding toward the rear end of the plunger. As shown in FIG. 4, when the plunger 22 is moved forward by operating the sealing cylinder 22A so that the valve body 24a is separated from the valve seat 22a, materials can be fed toward the end. In addition, when the plunger 24 is reversely moved backward so that the valve body 24a is brought into contact with the valve seat 22a, the retreat of the metered materials is cut off and injection can be performed.

In this embodiment, although an injection cylinder 72 is provided on the barrel 22, the operation thereof is similar to that of the injection cylinder shown in FIG. 1. Namely, the metered materials are injected by the forward movement of the barrel 22 which is gradually moved backward during the metering.

Since the configuration and operation are similar to those of the embodiment shown in FIG. 2, the same members are denoted by the same reference numerals and their description is omitted.

Figure 5:
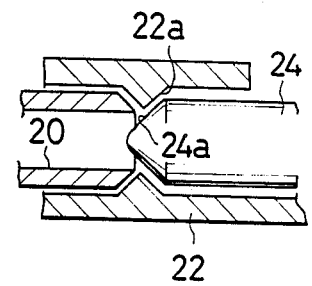
Figure 6:
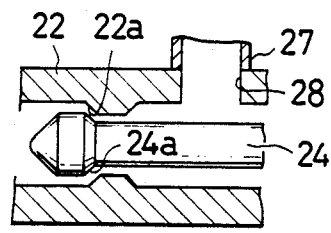

FIGS. 5 and 6 respectively show different configurations of a valve seat 22a, in which the diameter of the inner periphery of the barrel 22 is circularly reduced and the slope of the- reduced-diameter portion serves as the valve seat 22a.

Figure 7:
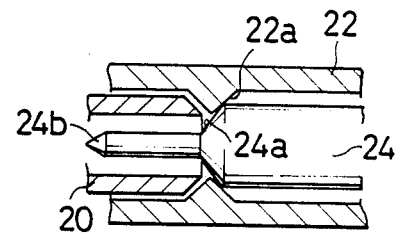

FIG. 7 is a sectional view of a main portion of an injection molding press in which a pre-heating plunger 24b is provided on the end of the plunger. This pre-heating plunger enables to reduce viscosity of the material remaining in the sleeve 20 by heating them and thus enables smoother injection molding.

Figure 8:
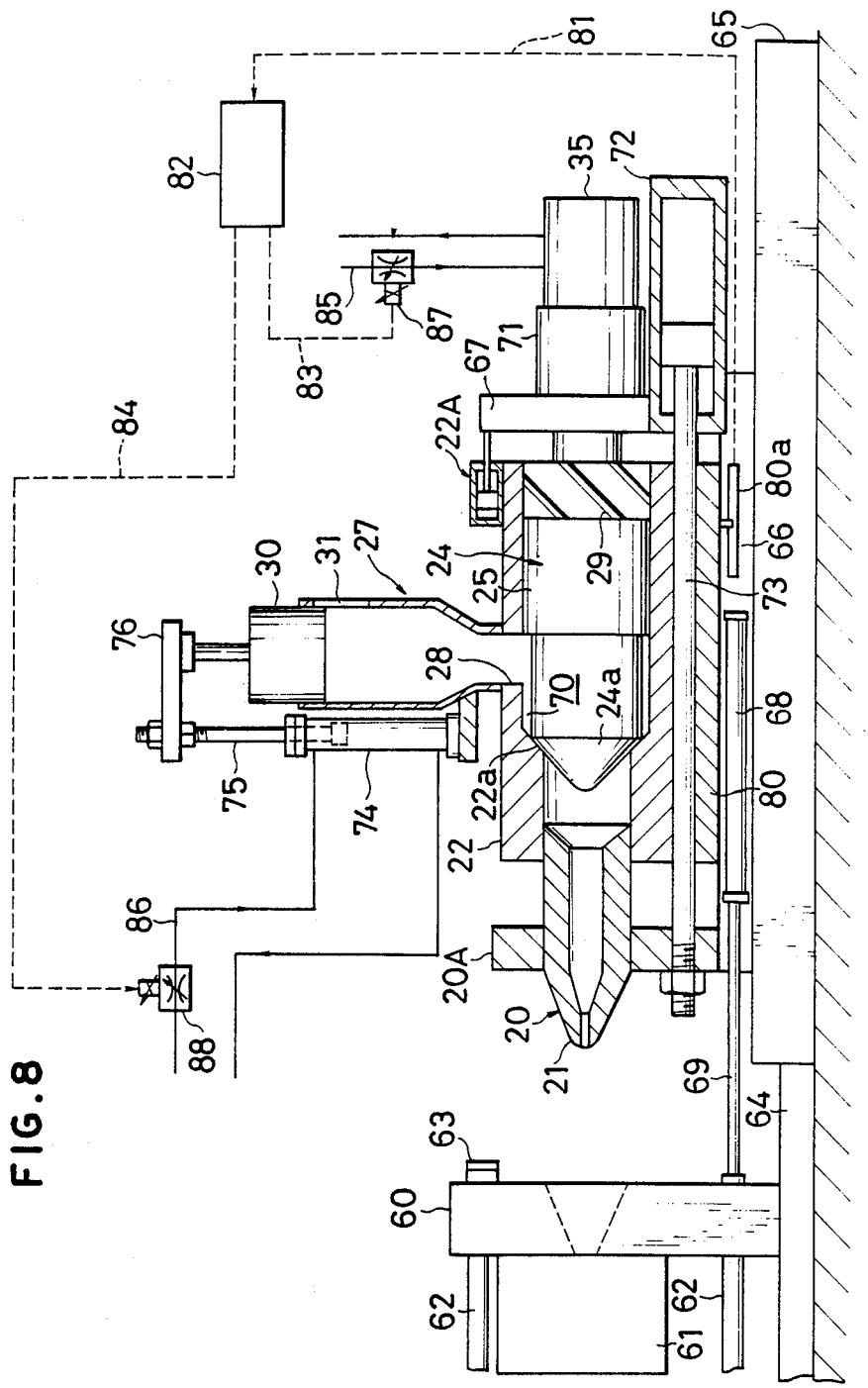
FIG. 8 is a sectional view of the whole of another injection molding press of the present invention.
Figure 9:
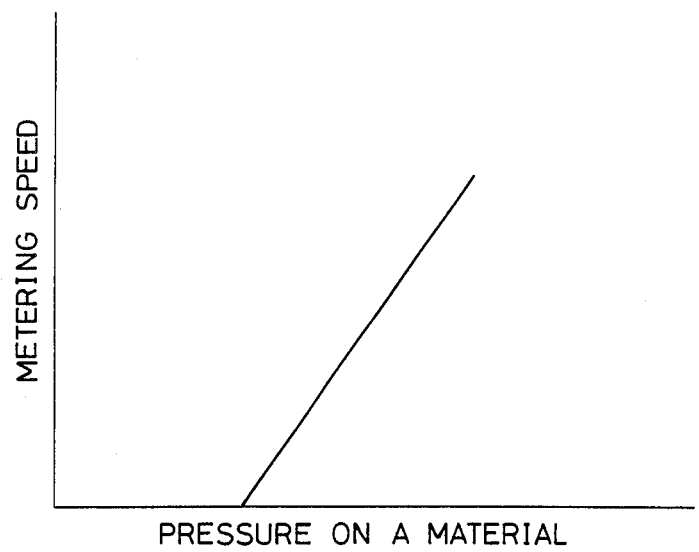
FIG. 9 is a graph showing the relationship between pressure in a material-pushing feeder and the metering speed.

FIG. 8 is a longitudinally sectional view of the whole of a further embodiment of the present invention.

When an injection cylinder 72 is operated, a barrel 22 is moved backward or forward, but this embodiment is provided with a speed detector 80a for detecting the backward speed of the barrel 22, the detection signal being input into a controller 82 through a signal conductor 81.

This controller 82 outputs through control signal conductors 83, 84 a control signal to control valves 87, 88 which are provided respectively on hydraulic piping 85 of a hydraulic motor 35 and hydraulic piping 86 of a cylinder 74.

Since the configuration of the other parts of the injection molding press shown in FIG. 8 is similar to that of the molding press shown in FIG. 1, the same members are denoted by the same reference numerals.

In the injection molding press shown in FIG. 8 which has a configuration as described above, in a state wherein the barrel 22 is placed- at the forward limit and the plunger 24 is rotated at a given number of revolutions by the hydraulic motor 35, materials such as BMC are charged in the stuffer 27 and are pushed downward by the stuffer plunger. As a result, the materials are advanced while passing through the passage in the outer periphery of the plunger 24 and then stored in the barrel 22 in the front of the plunger 24 and the sleeve 20 in turn.

Although the barrel 22 is gradually moved backward during this metering process, the backward velocity is detected by the detector 80a and input to the controller 82. The controller 82 compares a predetermined standard backward velccity with the present backward velocity and outputs a control signal to the valves 87, 88, corresponding to the differences. In this case, when either at the valves 87 or 88 is throttled, the revolutions of the motor 35 are reduced and the downward velocity of the stuffer plunger 30 is also reduced, resulting in a reduction in the metering speed (the backward speed of the plunger). If the opening of either the valve 87 or 88 is increased, the velocity of the motor 35 and the downward velocity of the plunger 30 are increased, resulting in an increase in the metering speed. In this way, the metering speed is certainly controlled so as to be a given value or more.

At the same time, a back pressure can be applied to the material in the barrel 22 by controlling the hydraulic pressure in a chamber on the rod end side of the injection cylinder 72.

In the above description, both the downward speed of the stuffer plunger 30 and the rotational speed of the plunger 24 are controlled, but, in the present invention, eithr of them may be controlled.

A description is now be made of a preferable example of methods of operating the molding press shown in FIG. 1.

In the molding press shown in FIG. 1, in a state wherein the barrel 22 is placed at the forward limit and the plunger placed at the backward limit is rotated at 25 to 150 rpm, a material such as BMC is charged in the stuffer 27 and pushed downward by the stuffer plunger 30. Consequently, the material is sent forward while passing through the passage 70 in the outer periphery of the plunger 24 and then stored in the barrel 22 and the sleeve 20 in turn. During this metering process, the barrel 22 is gradually moved backward. When BMC is used as a material to be charged in the stuffer 27, it is preferable that the temperature of the material is, for example, 40° to 60° C., the temperature of the injection mold is about 160° C., and the pressure at which the material is pushed downward by the stuffer plunger 30 is, for example, 2 Kg/cm$^2$ to 140 Kg/cm$^2$ (19.6 N/cm$^2$ to 1372 N/cm$^2$).

During this time, the pressure at which the material is pushed by the stuffer plunger 30 is reduced before the completion of the metering process in which a given amount of material is stored in the end of the barrel 22. This pressure may be gradually reduced in a continuous manner or a stepwise manner. When the stuffer plunger is moved downward to a given position and reaches a metering point, the metering porocess is completed, the stuffer plunger is stopped, and the rotation of the plunger being stopped. The plunger 24 is then moved forward by the sealing cylinder 22A so that the retreat of the material in the barrel 22 is cut off. The barrel 22 is then moved forward by the injection cylinder 72 so that the material is injected into the mold 61.

Since the material in the barrel 22 and the stuffer 27 expands at the start of the reduction in the above-described pressure which equalizes along with this reduction, in particular, it is possible to prevent the backward movement of the barrel 22 and the drooling phenomenon in which the material flows out from the nozzle 21. In particular, since the rotation of the plunger 24 rapidly produces a rapid equilibration of pressure with a good reproducibility, the metering accuracy is increased. If the time when the pressure is started to be reduced is appropriately selected, an overrun stroke over the metering point can be minimized.

In this operating method, the pressure which is higher than that before the pressure in the stuffer is started to be reduced produces an amount of expansion which is correspondingly greater than that of the materials after the reduction in pressure. Therefore, when the material is pushed by the stuffer plunger 30 at higher pressure, the pressure of the stuffer 27 must be started to be reduced at an early time. Reversely, when the material is pushed by the stuffer plunger 30 at a lower pressure, the pressure must be automatically controlled so that it is started to be reduced at a point nearer the metering point.

In addition, in this operating method, the metering speed between the start of the reduction in pressure and the completion of metering is smaller than that before the reduction in pressure. Therefore, if the pressure is reduced at a too early time with a view to reducing an overrun stroke from the metering point, the whole of the metering process possibly takes a long time. In such a case, a method is effective in which the stuffer plunger 30 is raised by, for example, about 2 to 100 mm, at the same time the completion of the metering in place of a change in the starting point of the reduction in pressure, so that residual pressure of the molding material in the stuffer 27 and the barrel 22 is eliminated.

It is also effective for preventing an overrun stroke of the stuffer plunger 30 and improving the metering accuracy to reduce the number of revolutions of the plunger before the completion of the metering process or increase back pressure of the plunger 24 before the completion of the metering process.

This operating method is described with reference to the press shown in FIG. 1, but this method can be applied to the injection molding presses shown in FIG. 3 and the other drawings.

A description will now be made of another preferable method of injeciton molding using the injection molding press shown in FIG. 1.

In this method, the barrel 22 is moved backward before the metering process starts so that a space having a volume of 30 to 90% of the predetermined volume to be metered is provided in front of the plunger 24. A typical example is described below.

In the press shown in FIG. 1, in a state wherein the barrel 22 having a diameter of 100 mm was set at a position which was 80 mm behind the forward limit and the plunger 24 placed at the backward limit was rotated at 25 to 150 rpm, BMC (JMC-B produced by Nippon Shokubai Kagaku Kogyo Co., Ltd.) was charged in the stuffer 27 and pushed downward bY the stuffer plunger 30. As a result, the material was sent forward while passing through the passage in the outer periphery of the plunger 24 and stored in turn in the barrel and the sleeve 20. In this metering process, the barrel was gradually moved backward by 8 mm. The temperature of the BMC material was 40° to 60° C., the temperature of the injection mold was about 160° C., and the pressure at which the material was pushed downward was about 70 Kg/cm$^2$.

After a desired amount of material has been stored in the end of the barrel 22, the rotation of the plunger 24 was stopped and the plunger 24 was moved forward by the cylinder 2A so as to block up the retreat of the material. The plunger was then moved forward by operating the injection cylinder 72 so that the material was injected into the mold.

As a result, impact strength (obtained by the Izod flatwise method) was 28.4 Kg cm/cm$^2$ (278.3 N cm/cm$^2$) and the metering ability was 630 Kg/H.

As a comparison, injection molding was performed in the same way as the above-described operating example with the exception that the barrel 22 was previously placed at the forward limit. As a result, impact strength of the molded product was 26.4 Kg cm/cm$^2$ (262.6 N cm/cm$^2$) and the metering ability was greatly reduced to 230 Kg/H. In addition, the time required for metering once was 16 sec in the comprative example and 6 sec in the above-described example.

The the above-described operating method performed with respect to the press shown in FIG. 1 can be applied to methods of operating the injection molding presses shown in FIG. 3 and the other drawings.

I claim:
1. A method of operating an injection molding press for injection molding a resin materials, comprising:
preparing a hollow barrel having front and rear sides, a material inlet at the rear side, and valve seat means situated between the front and rear sides,
arranging a plunger in the rear side of the barrel so that a space is formed between a part of an inner surface of the barrel and a part of an outer surface of the plunger, said plunger having valve body means a a front side thereof, arranging a sleeve in the front side of the barrel so that barrel slides relative to the sleeve, moving the plunger situated in the barrel rearwardly so that the valve body means of the plunger disengages from the valve seat means of the barrel to thereby provide communication between the material inlet and the front side of the barrel, moving the barrel to a forward position relative to the sleeve so that a part of the sleeve slidably retained in the barrel is located in the front portion of the barrel, rotating the plunger at a predetermined speed, charging the resin material into material pushing-supplying means attached to the material inlet of the barrel, supplying the resin materials from the material pushing-supplying means to the front side of the barrel through the material inlet, the space between the inner surface of the barrel and the plunger and a space between the valve seat means and the valve body means, reducing the supply pressure of the resin materials at the material pushing-supply means before the total amount of the resin materials is supplied to the material inlet, stopping rotation of the plunger after the resin materials are completely fed into the front side of the barrel, moving the plunger relative to the barrel so that the valve body means is seated onto the valve seat means to prevent the resin materials to pass therebetween, and moving the barrel relative to the sleeve so that the resin materials stored at the front side of the barrel is ejected from the barrel to a mold through the sleeve.

2. A method according to claim 1, wherein while the resin materials are supplied from the material pushing-supplying means to the from side of the barrel, the barrel is slowly moved away from the sleeve so that the resin materials are stored in the front side of the barrel.

3. A method according to claim 2, wherein the barrel is moved relative to the sleeve so that the back pressure is applied to the resin materials in the front side of the barrel.

4. A method according to claim 3, wherein said resin materials are heated while the resin materials are fed into the mold.

5. A method according to claim 4, wherein before stopping rotation of the plunger, pressure of the resin material at the material pushing-supply means is completely eliminated so that residual pressure in the material pushing-supply means and barrel is substantially eliminated.

6. An injection molding press for injection molding of resin materials, comprising:

a hollow barrel for storing the resin amterials therein, said barrel having front and rear sides, a material inlet formed at the rear side thereof for introducing the resin materials therein, and valve seat means situated inside the barrel at an area between the front and rear sides, a sleeve having an injection nozzle at a front end and a through hole therein to allow the resin materials to pass therethrough when molding, said sleeve being partly slidably situated inside the barrel at the front side of the barrel so that the barrel slides relative to the sleeve, means for reciprocally moving the barrel relative to the sleeve connected between the sleeve and the barrel, a plunger situated in the rear side of the barrel, said plunger having valve body means at a front side thereof to engage with and disengage from the valve seat means of the barrel, and a side portion extending from a side adjacent the material inlet of the barrel to a portion adjacent the valve body means so that a space is formed between the side portion and inner surface of the barrel to allow the resin materials to pass therethrough and enter into the front side of the barrel only when the valve body means does not engage the valve seal means, means for rotating the plunger relative to the barrel to supply the resin materials from the material inlet to the front side of the barrel by means of the plunger, means for reciprocally moving the plunger relative to the barrel so that the valve body mean engages with and disengages from the valve seat means, and material supply means attached to the material inlet of the barrel, the resin materials to be injected being forcibly supplied from the material supply means to the material inlet, whereby when the barrel is placed in a rear position relative to the sleeve and the valve body means of the plunger is located away from the valve seat means of the barrel, the resin materials is supplied from the material supply means to the front side of the barrel through the space between the barrel and the plunger, and when the valve body means is engaged with the valve seat means and the barrel is moved relative to the sleeve, the resin materials retained in the front side of the barrel is ejected through the sleeve for molding.

7. An injection molding press according to claim 6, wherein said valve seat means comprises a tapered surface having a diameter -that decreases toward the end of said barrel and said valve body means is provided on the end of said plunger and comprises a tapered surface having a diameter that descreses toward said end of said plunger.

8. An injection molding press according to claim 6, wherein said valve seat means comprises a tapered surface having a diameter that increases toward said end of said barrel and said valve body means is provided in the periphery of said plunger and comprises a tapered surface having a diameter that decreases toward the rear end of said plunger.

9. An injection molding press according to claim 6 further comprising a detector for deteoting the backward speed of said barrel and a controller for controlling the number of revolutions of said rotational drive unit so that the backward speed detected by said detector is a given value.

10. An injection molding press according to claim 6 further comprising a detector for detecting the backward speed of said barrel and a controller for controlling a speed at which a material feeder supply said materials so that the backward speed detected by said detector is a given value.

11. An injection molding press according to claim 6, wherein said plunger is provided with a heater for heating said materials at the end.

12. An injection molding press for injection molding of resin materials, comprising:
- a hollow barrel for storing the resin materials therein, said barrel having front and rear sides, a material inlet formed at the rear side thereof for introducing the resin materials therein, and valve seat means situated inside the barrel at an area between the front and rear sides, said valve seat means having a tapered concave surface having th ®diameter decreasing toward the front end of the barrel,
- a sleeve having an injection nozzle at a front end, a through hole therein to allow the resin materials to pass therethrough when molding, and a tapered concave surface at a rear end having the diameter decreasing toward the front end of the sleeve, said sleeve being partly slidably situated inside the barrel at the front side of the barrel so that the barrel slides relative to the sleeve,
- means reciprocally moving the barrel relative the sleevee connected between the sleeve and the barrel,
- a plunger situated in the rear side of the barrel, said plunger having valve body means at a front side thereof to engage with and disengage from the valve seat means fo the barrel, said valve body means having a tapered convex surface having the diameter decreasing toward the front end of the plunger so that the plunger snugly fits the valve seat means of the barrel and the tapered concave surface of the sleeve when engaged together, and a reduced diameter portion with a circular surface extending from a side adjacent the material inlet of the barrel to a portion adjacent the valve body means so that a space is formed between the reduced diameter portion and the inner surface of the barrel to allow the resin materials to pass therethrough and enter into the front sid of the barrel by means of the plunger only when the valve body means does not engage the valve seal means,
- means for rotating the plunger relative to the barrel to supply the resin materials from the material inlet to the front side of the barrel by means of the plunger,
- means for reciprocally moving the plunger relative to the barrel so that the valve body means engages with and disengages from the valve seat means, and
- material supply means attached to the material inlet of the barrel, said material supply means having a casing connected to the barrel and a plunger situated in the casing so that the resin materials in the casing is forcibly supplied from the material supply means to the material inlet by the plunger attached to the casing,
- whereby when the barrel is situated in a rear position relative to the sleeve and the valve body means of the plunger is placed away from the valve seat means of the barrel, the resin material is supplied from the material supply means to the front side of the barrel through the space between the barrel and the plunger, and when the valve body means is engaged with the valve seat means and the barrel is moved relative to the sleeve, the resin materials retained in the front side ofthe barrel is ejected through the sleeve for molding.

13. An injection molding press according to claim 12, wherein said plunger further includes a screw situated at the opposite side of the valve body means to smoothly exhaust the resin materials leaked backwardly.

14. An injection molding press according to claim 13, further comprising a block on which the sleeve is fixed and the barrel is slidably situated.

15. An injection molding press according to claim 14, further comprising a fixed mold, and means for moving the block relative to the fixed mold, said block being moved toward the fixed mold when injection molding.

* * * * *